US009002791B2

(12) United States Patent
Chakrabarti et al.

(10) Patent No.: US 9,002,791 B2
(45) Date of Patent: Apr. 7, 2015

(54) LOGGING MODIFICATIONS TO A VARIABLE IN PERSISTENT MEMORY

(75) Inventors: Dhruva Chakrabarti, San Jose, CA (US); Hans Boehm, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 297 days.

(21) Appl. No.: 13/596,500

(22) Filed: Aug. 28, 2012

(65) Prior Publication Data
US 2014/0067761 A1   Mar. 6, 2014

(51) Int. Cl.
*G06F 17/30* (2006.01)
*G06F 7/00* (2006.01)
*G06F 11/14* (2006.01)

(52) U.S. Cl.
CPC .............. *G06F 7/00* (2013.01); *G06F 11/1471* (2013.01); *G06F 17/30359* (2013.01)

(58) Field of Classification Search
None
See application file for complete search history.

(56) References Cited

U.S. PATENT DOCUMENTS

| 2003/0088814 | A1* | 5/2003 | Campbell et al. | 714/54 |
| 2006/0259723 | A1* | 11/2006 | Petruzzo | 711/162 |
| 2010/0037094 | A1* | 2/2010 | Bak et al. | 714/15 |

OTHER PUBLICATIONS

Chandy, K., et al., Distributed Snapshots: Determining Global States of Distributed Systems, ACM Transactions on Computer Systems, vol. 3, No. 1, Feb. 1985, pp. 63-75.

Coburn, J., et al., NV-Heaps: Making Persistent Objects Fast and Safe with Next-Generation, Non-Volatile Memories, ASPLOS'11, Mar. 5-11, 2011, Newport Beach, CA, 13 pgs.
Flanagan, C., et al., FastTrack: Efficient and Precise Dynamic Race Detection, PLDI'09, Jun. 15-20, 2009, Dublin, Ireland, 13 pgs.
Rieker, M., et al., Transparent User-Level Checkpointing for the Native POSIX Thread Library for Linux, http://people.csail.mit.edu/jansel/papers/2006pdpta.pdf, Jun. 26-29, 2006, 7 pgs.
Sorin, D.J., et al., SafetyNet: Improving the Availability of Shared Memory Multiprocessors with Global Checkpoint/Recovery, 29th Annual International Symposium on Computer Architecture (ISCA-29), Anchorage, AK, May 25-29, 2002, 12 pgs.
Volos, H., et al., Mnemosyne: Lightweight Persistent Memory, ASPLOS'11, Mar. 5-11, 2011, Newport Beach, CA, 13 pgs.
Xu, M., et al., A "Flight Data Recorder" for Enabling Full-system Multiprocessor Deterministic Replay, 30th Annual International Symposium on Computer Architecture (ISCA-30), San Diego, CA, Jun. 9-11, 2003, 12 pgs.
Ziarek, L., et al., Modular Checkpointing for Atomicity, www.sciencedirect.com, Jun. 22, 2007, 31 pgs.

* cited by examiner

*Primary Examiner* — Bai D. Vu
(74) *Attorney, Agent, or Firm* — Wagner Blecher, LLP

(57) ABSTRACT

A log entry is created in persistent memory that represents a modification to a variable that resides in persistent memory. A log entry is created in persistent memory that represents a synchronization operation. A program-order based dynamic ordering relationship is created between two successive log entries within an execution entity. A synchronization-order based dynamic ordering relationship is created between two log entries corresponding to synchronization operations in concurrently executing distinct execution entities of said execution instance.

20 Claims, 7 Drawing Sheets

LOGGING MODIFICATIONS TO A VARIABLE IN PERSISTENT MEMORY

RELATED APPLICATION SECTION

This application is related to co-pending U.S. patent application Ser. No. 13/441,656 filed on Apr. 6, 2012 entitled "Identifying Globally Consistent States in a Multithreaded Program" by Chakrabarti, and assigned to the assignee of the present application.

BACKGROUND

Persistent memory maintains the values stored in variables even after the computer system where the persistent memory (also known as "non-volatile memory") resides has lost power. Therefore, if a value is stored in a persistent variable before the computer system crashes, that same value will still be stored in that persistent variable when the computer system is powered back on.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

DESCRIPTION OF EMBODIMENTS

Figure 1:
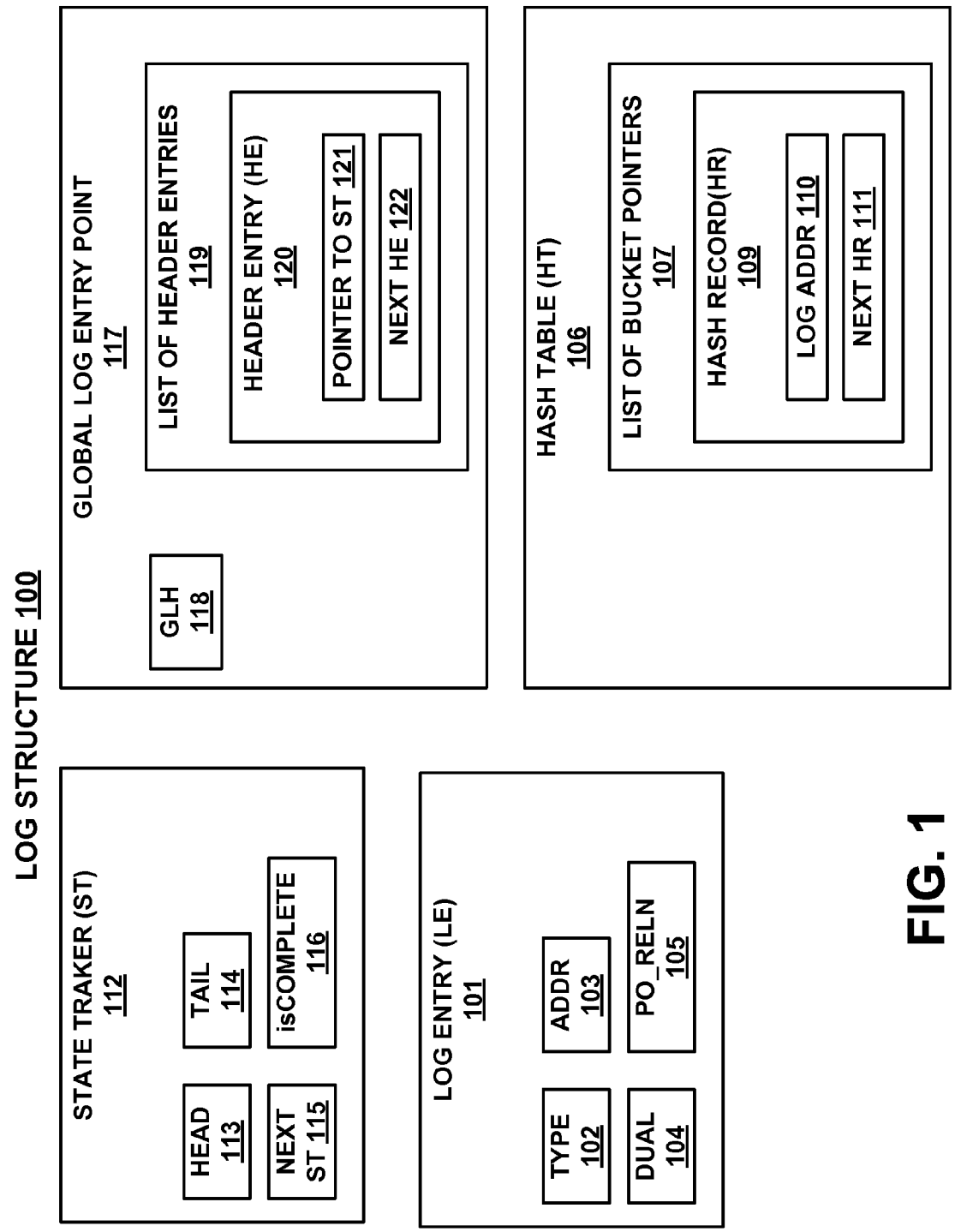
FIG. 1 depicts a block diagram of a log structure for logging modifications to a persistent variable, according to one embodiment.

According to one embodiment, an application may be represented by source code and each instance of execution of that source code is an instance of that application. One or more execution entities, such as threads or processes, can be associated with an application instance. An application instance can store values to variables in persistent memory (referred to herein as "persistent variables"). As discussed herein, the same value will be available in a persistent variable after the computer system has been powered back on after it has lost power. If the value of a persistent variable is corrupted or if there is an inconsistency in the value with respect to different execution entities in an application instance, the problem cannot be fixed by rebooting the computer system.

Therefore, according to various embodiments, the logging of modifications to a persistent variable is provided in order to deal with problems such as corruption or inconsistencies that enable unwinding an application instance back to a consistent state. According to one embodiment, the logging of the modifications to a persistent variable enables determination of the order in which modifications to that persistent variable were performed, as will become more evident.

According to various embodiments, a way of building a structure of log entries is provided so that distinct execution entities can traverse and read the log entries safely at the same time that the structure is being built. An execution instance of the application is able to modify the log entries as well. Non-blocking, concurrent access by different execution entities allows dynamic, efficient, concurrent computation of properties of the application instance, according to one embodiment. An example is computation of a globally consistent state and its evolution as the application instance executes. A globally consistent state can be useful for machines with non-volatile memory (NVM) where a byte addressable store can result in data persisting in memory. In a specific example, persistent memory may be located on the memory bus of a computer system that executes one or more execution entities that modify the values of the persistent variables. This is in contrast to the current use of block interfaces for writing data persistently, for example, to a disk drive. Without a mechanism that provides consistency, a failure at an opportune time may leave persistent data inconsistent, causing it to appear corrupt and unusable to an execution entity that accesses the data.

According to one embodiment, individual execution entities, such as threads, record their own state (referred to as "local state"), maintain intra- and inter-execution entity dependencies between such states, and compute a globally consistent state (GCS) based on those dependencies. For example, if a state x happens after state y, state x can be included in the above GCS only if state y is also included. Local states or log entries that capture the writes performed by execution entities can be analyzed offline for computing a GCS. However, according to one embodiment, capturing a GCS can be done while an application instance, that contains a single execution entity or multiple execution entities, updates a persistent variable. Such an online capture of a GCS enables continual pruning of the log entries. Simultaneously, the states and dependencies can be built as the application instance that modifies the persistent variable is executing, according to various embodiments.

According to one embodiment, a relationship can exist between two log entries. The relationship can be either an intra-execution entity relationship or an inter-execution entity relationship. An intra-execution entity relationship (also referred to herein as "program order") can arise out of the order of the instructions associated with the execution entity. If an operation x is executed before (after) an operation y by the same execution entity, then operation x happens before (after) operation y. An inter-execution entity relationship can arise out of synchronization operations. For example, if an execution entity t1 acquires a lock L after execution entity t2 releases the same lock L, then a happens-before relationship can exist from the release of the lock L in execution entity t2 to its acquisition in execution entity t1. In this example, a happens-after relationship exists from the lock acquisition in execution entity t1 to the lock release in execution entity t2.

According to one embodiment, log entries are created to represent writes to persistent variables. Reads of persistent variables do not have to be logged since they do not result in changes to the persistent variables. The dependencies that arise from the reads may be represented. However, according to various embodiments, tracking either happens-before or happens after dependencies through synchronization operations, such as lock acquires and releases, are enough to capture the pertinent dependencies. Various embodiments are also well suited for fork and join operations. Various embodiments are also well suited for deriving happens-after dependencies from happens-before dependencies and vice versa.

According to one embodiment, the log entries are created in persistent memory as well, so that if a crash-restart occurs, the recovery process can make use of the log entries in persistent memory to revert the persistent application state, which will possibly be inconsistent, back to a globally consistent state (GCS).

Execution entities include operations (also known as "instructions") that perform reads or writes to persistent variables and operations that provide for mutually exclusive instruction execution regions. According to one embodiment, instructions performing modifications to a persistent variable, such as write instructions, are performed inside of a mutually exclusive instruction execution region to prevent, among other things, inconsistencies of persistent variables or data races between execution entities.

Examples of mutually exclusive instruction execution regions include, but are not limited to, critical sections and atomic sections. A critical section is begun with an instruction acquiring a lock (also known as "lock acquisition") and ends with an instruction releasing the acquired lock (also known as a "lock release"). An atomic section can be begun with, for example, an "atomic" keyword and a character such as a beginning curly bracket "{" and end with, for example, a character such as an ending curly bracket "}." The acquisition of a lock, the release of a lock, the "atomic" keyword and a character that begins an atomic section, and a character that ends an atomic section are examples of code constructs of a mutually exclusive instruction execution region. The instructions between a pair of code constructs are examples of a code section.

FIG. 1 depicts a block diagram of a log structure for logging modifications to a persistent variable, according to one embodiment. The blocks that represent features in FIG. 1 can be arranged differently than as illustrated, and can implement additional or fewer features than what are described herein. Further, the features represented by the blocks in FIG. 1 can be combined in various ways. As depicted, the log structure 100 includes various data structures, such as a state tracker (ST) 112, a global log entry point 117, a log entry (LE) 101, and a hash table (HT) 106.

A log entry 101 may contain four fields such as a type (ty) 102, a memory address (addr) 103, a dual 104, which may be pointer-sized, and a program order relationship field (PO_reln) 105. The type field 102 indicates the kind of operation the log entry 101 corresponds to. Examples of the kinds of operation that a log entry 101 can correspond to include a store to a persistent variable, the beginning of a mutually exclusive instruction execution region, such as an instruction to acquire a lock or the beginning of an atomic section, and the end of the mutually exclusive instruction execution region, such as an instruction to release the lock or the end of an atomic section. The addr field 103 is the address of the location being written to in the case of a write and the addr field 103 is the address of the lock in the case of an acquire or release operation.

In one embodiment, for a write, dual 104 captures the last value of addr 103. Thus, according to one embodiment, the log entries 101 can be used as undo log entries that can be used during a recovery phase. Other embodiments are possible as well. For a lock acquire, dual 104 points to the log entry for the last release of the same lock. For a lock release, dual 104 is null.

For a given log entry 101, the PO_reln 105 points to the log entry 101 created last by the same execution entity. According to one embodiment, a log entry 101's fields are written only once. Once created, the individual fields 102, 103, 104, 105 of a log entry 101 are not mutated henceforth by any execution entity. However, it is possible for a log entry 101 to become unnecessary and be removed entirely from the log structure 100 (also referred to as "pruning"). According to one embodiment, a plurality of log entries 101 for an execution entity are referred to as that execution entity's consistent mutually exclusive instruction execution region (CREG), also referred to as "instruction region" for the sake of simplicity. In one embodiment, a CREG starts and ends at points of an application instance where no locks are held.

For every CREG, some metadata, which are represented by a state tracker ST according to one embodiment, is maintained. The state tracker 112 includes pointers, such as head 113, tail 114, next ST 115, and is Complete 116. Head 113 points to the first log entry 101 for the CREG associated with that state tracker 112. The tail 114 points to last log entry 101 for the CREG associated with the same state tracker 112. "Next ST" 115 points to the next state tracker 112 in the program order for that execution entity. The is Complete field 116 indicates whether the corresponding CREG has completed execution.

During creation of a CREG with log entries 101, tail 114 can change until the CREG is complete. As long as the CREG is incomplete, tail 114 is made to atomically point to the last log entry 101 created until that point of time for that CREG. The atomic operation ensures that all other execution entities see the effect of the operation in its entirety. Tail 114 becomes immutable once the last operation in that CREG is executed. The "next ST" field 114 is first set to null but then made to atomically point to the metadata as represented by a state tracker 112 associated with the succeeding CREG. Thus, "next ST" 115 remains mutable for some time before changing to immutable. The log entries 101 within every CREG can be concurrently accessed at any point in time, even before it is complete. However, most execution entities, such as one wanting to compute any global property of the application instance from the log entries 101, would examine a local state when it is quiescent, for example, when is Complete 116 has been set to true, according to one embodiment. The global log entry point 117 includes a global log header (GLH) 118 and a list of header entries (HEs) 119. The list of header entries 119 includes one or more header entries 120. Each header entry 120 includes a pointer to a state tracker 121 and a "next HE" 122. The "pointer to ST" 121 may point to the first state tracker (ST) 112 for the execution entity that corresponds to the same header entry 120. The pointer to next HE 122 may point to the next header entry (HE) 120 in the header entry list 119. According to one embodiment, the CREGs of an execution entity are accessible through the global log entry point 117. The header entries 120 corresponding to execution entities can be organized in the form of a list 119. The global log header (GLH) 118 points to the first header entry 120 in the list of header entries 119. The GLH 118 can be used as a global gateway to the log entries 101.

Neither of the two header entry fields 121, 122 needs to be atomic since the HE fields 121 and 122 are assigned once by an execution entity and then published to other execution entities. Once the HE fields 121 and 122 are published, they are immutable, according to one embodiment. An execution entity that wants to traverse the log entries 101 can start from GLH 118 and read the CREGs from the header entries 120 even when a concurrent addition of a new log entry 101 is in progress. This is rendered possible by inserting new header entries 120 at the head of the list of header entries 119 pointed to by the GLH 118, making sure that the existing data structures accessible from GLH 118 will not be changed, according to one embodiment. A compare-and-swap loop (CAS-loop), according to one embodiment, is used to allow correct concurrent insertion of header entries by multiple execution entities.

The hash table (HT) 106 includes a list of bucket pointers 107 where each bucket includes a list of hash records (HR) 109 for a particular lock. A hash record (HR) 109 includes a log address 110 and a next HR 111. The log address ("log addr") 110 may point to a log entry for the last release of a lock. Corresponding "next HR" 111 associated with the hash record 109 points to the next hash record. According to one embodiment, the hash table (HT) 106 is shared among all of the execution entities associated with an application instance and the one or more execution entities that are used for creating, traversing, maintaining, or modifying, or combination thereof, the log structure 100 in order to maintain the correlation between a lock address and a log entry 101.

"Next HR" 111 is assigned by an execution entity before being inserted into the hash table 106. Once a hash record HR 109 is inserted into the hash table 106, the next HR 111 is immutable, according to one embodiment. This is made possible, according to one embodiment, by inserting new hash record 109 at the head of the list corresponding to a bucket for a lock. For this reason, the bucket pointers 107 may also be marked atomic. The log address 110 is marked atomic since it can change multiple times as one or more execution entities associated with an application instance execute.

According to one embodiment, two operations are supported on a hash table 106. Those two operations are "insert" and "find". Both of the insert and the find can be implemented in a non-blocking manner. According to one embodiment, once a "find" for a lock L has been invoked, no new log entry corresponding to that lock L will be inserted into the hash table 106 before the "find" operation completes.

According to one embodiment, an insertion into the hash table 106 happens at the head of the corresponding hash table bucket. This guarantees that any concurrent "find" operation will identify the relevant hash table bucket, read the pointer 107 of that bucket atomically, and scan through the obtained list in a safe manner. If the log address 110 of hash record 109 for a bucket in the hash table 106 has a matching lock, that log address 110 is returned. Otherwise, it is assured that no match exists in the hash table 106.

For an "insert" operation, a "find" is invoked first. If a hash record 109 is found by the find, the log address 110 of the hash record 109 is atomically changed to the new log entry 101. If no hash record 109 is found, a new hash record 109 is created and populated. The log address 110 is set to the address of a log entry 101 for a lock release, the "next HR" field is set to point to the first hash record 109 for the bucket, and the bucket pointer 107 is set to point to this new hash record 109. The bucket pointer 107 is retrieved and set within a compare-and-swap loop (CAS-loop) to ensure concurrent non-blocking construction of the hash table 106. According to one embodiment, while collisions are possible in the open hashing scheme, no false conflicts are possible, meaning that when the hash table 106 is queried with a lock address, the log entry for the last release of this lock is computed precisely. According to one embodiment, no delete operator on the hash table 106 is provided but this may be combined with a scheme for eventually garbage collecting unused hash records.

Figure 2A:
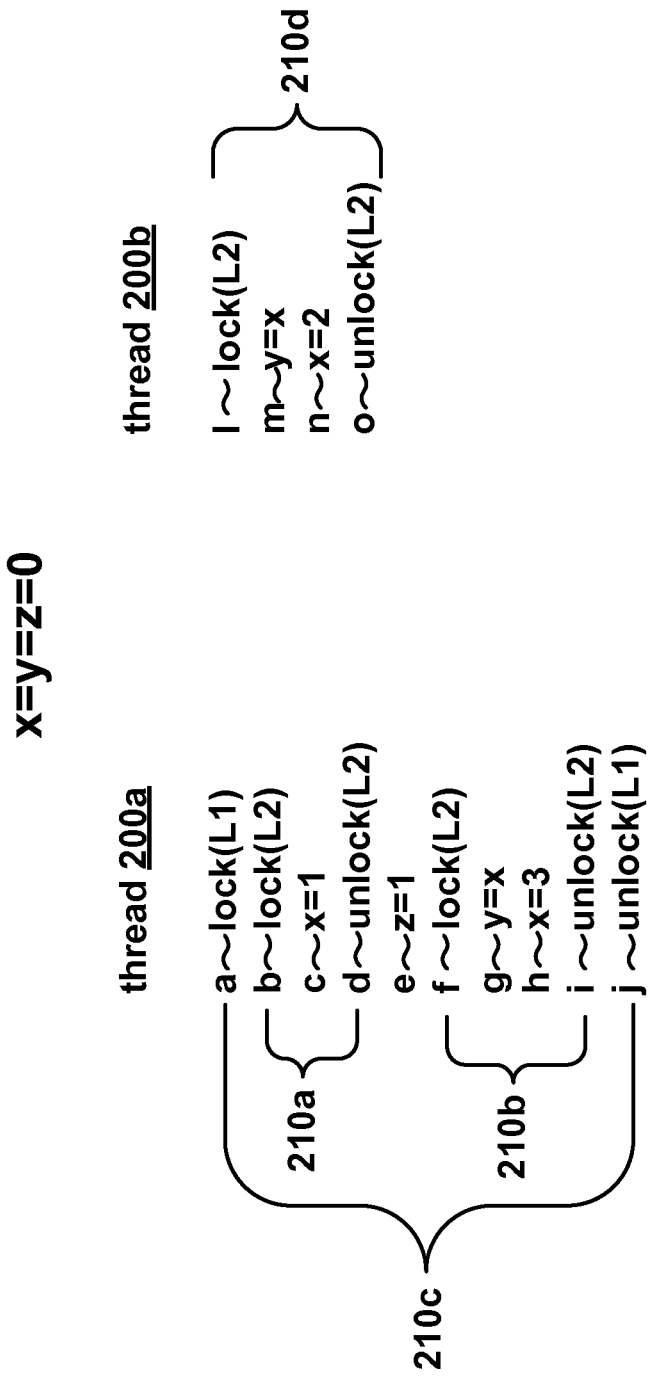
FIG. 2A depicts an example of a code segment containing two execution entities, according to one embodiment.
Figure 2B:
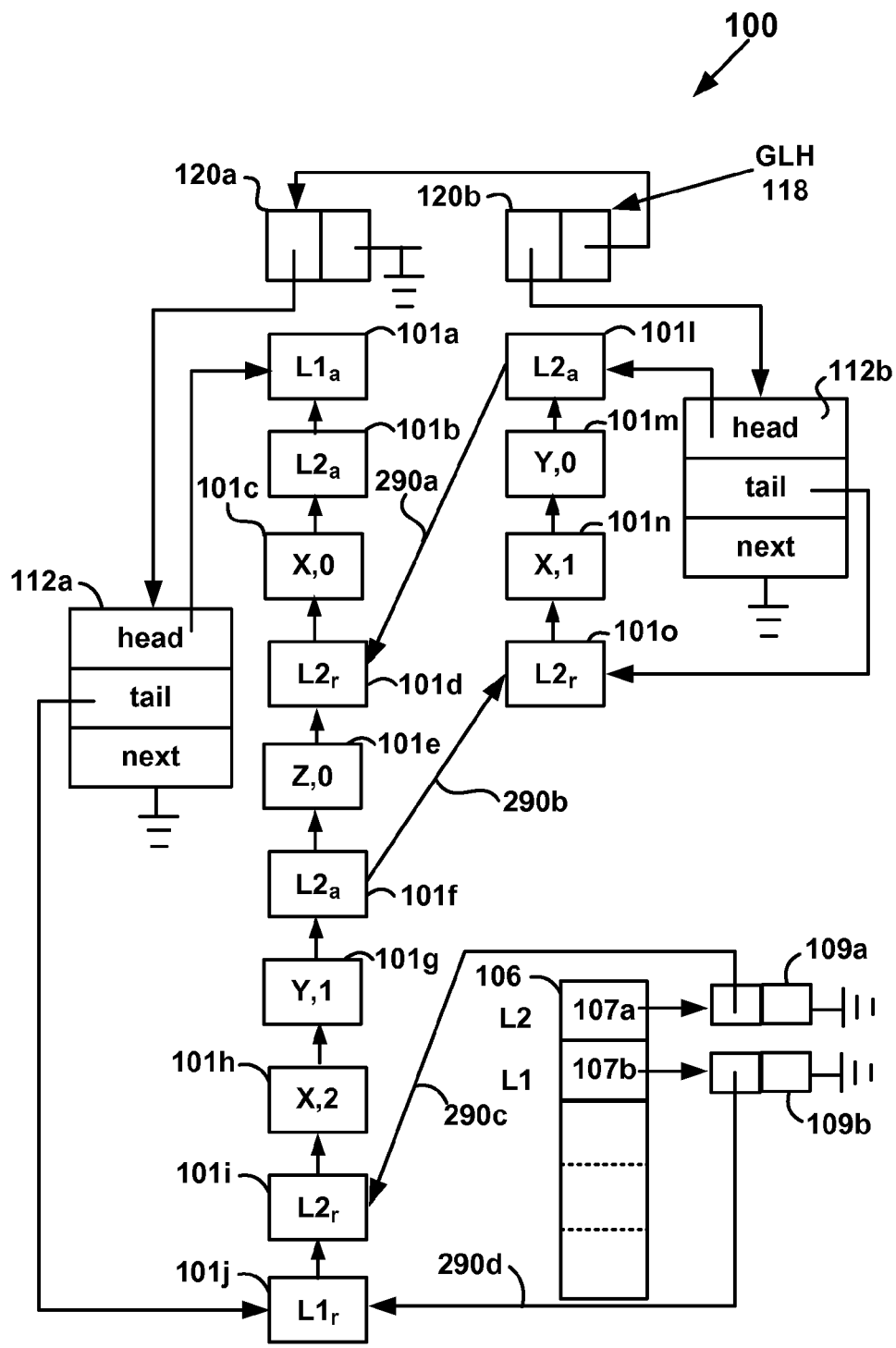
FIG. 2B depicts an example of a log structure for the code segment in FIG. 2A, according to one embodiment.

FIG. 2A depicts an application instance, according to one embodiment. FIG. 2B depicts a block diagram of a log structure 100, according to one embodiment. The blocks that represent features in FIGS. 2A and 2B can be arranged differently than as illustrated, and can implement additional or fewer features than what are described herein. Further, the features represented by the blocks in FIGS. 2A and 2B can be combined in various ways.

In FIG. 2A, two execution entities 200a, 200b are depicted. According to one embodiment, an execution entity is a thread or a process. Execution entity 200a includes instructions a-j and execution entity 200b includes instructions l-o. For the sake of illustration assume that the variables x, y, and z are persistent variables. Execution entities 200a and 200b include instructions c, e, g, h, m, n that perform modifications on the persistent variables. The persistent variables x, y, and z are initially set to zero.

Both execution entities 200a, 200b have mutually exclusive instruction execution regions 210a-210d that are demarcated by lock acquisitions and releases. In this illustration, the execution entities 200a, 200b are implemented using critical sections. In this illustration, lock L2 is used for protecting shared variables x and y, and lock L1 is used for protecting shared variable z.

FIG. 2B depicts a log structure 100 for logging modifications to a variable in persistent memory, according to one embodiment. The structure 100 reflects the logging modifications for the application instance's 200a, 200b persistent variables x, y and z and, therefore, shall be described in the context of application instance 200. The structure 100 includes two header entries 120a, 120b, log entries 101a-101o, state trackers 112a, 112b, a hash table 106, and hash records 109a, 109b.

The log entries 101a-101o are organized on a per execution entity basis, according to one embodiment. For example, execution entity 200a's log entries 101a-101j are linked together in one list and execution entity 200b's log entries 101l-101o are linked together in another list. There is a header entry 120a, 120b for each of the execution entities 200a, 200b. The header entries 120a, 120b are linked together in a list 119. There is a global list header (GLH 118), for accessing the list 119, thus providing a global log entry point 117.

Further, there are state trackers 112a, 112b on a per execution entity basis. For example, execution entity 200a's state tracker is state tracker 112a and execution entity 200b's state tracker is state tracker 112b. The hash table (HT) 106 has one or more bucket pointers 107 that correspond to the releases for each of the locks L1 and L2 depicted in FIGS. 2A, 2B. For example, FIGS. 2A, 2B depict two locks L1 and L2. Therefore, the hash table 106 includes a bucket pointer 107a to a list of hash records that represents the last release of lock L2 and another bucket pointer 107b points to a list of hash records that represents the last release of lock L1. Each of the bucket pointers 107a, 107b points to a respective hash record (HR) 109a, 109b for the respective lock releases of L2 and L1.

For the sake of illustration, assume that execution entity 200a starts executing before execution entity 200b. Further, for the sake of illustration, assume that execution entity 200a obtains the lock L2 at instruction b before the instruction l of execution entity 200b is executed. In this case, instructions a-d of execution entity 200a are executed and the corresponding log entries 101a-101d are created before instruction l of execution entity 200b is executed. When instruction d is executed, the hash record 109a for the bucket pointer 107a corresponding to lock L2 is updated to point to the log entry 101d that represents the most recent release of lock L2.

The instruction l executes to obtain lock L2 and the log entry 101l is created for execution entity 200b. The hash table 106 is searched to obtain a pointer to the log entry for the last release of lock L2. At this point in this illustration, the hash record 109a is pointing to log entry 101d. This pointer can be used to update log entry 101*l* to point to log entry 101*d* as indicated by 290*a*. Other timings of execution of the instructions are possible.

Execution entity 200*a*'s first unlock of L2 as a result of executing instruction d happens before execution entity 200*b*'s lock of L2 as a result of executing instruction I in this illustration. Execution entity 200*b* continues execution resulting in the creation of log entries 101*m*-101*o* for the respective instructions m-o. When instruction o is executed, the hash record 109*a* is updated to point to log entry 101*o* since it is the last release of lock L2 at this point in time in this illustration. Other timings of execution of the instructions are possible.

The execution of instruction e can be executed at any point in time during the execution of execution entity 200*a* since instruction e's execution is protected by lock L1 whereas execution entity 200*b* is entirely protected by lock L2. Log entry 101*e* is created as a result of the execution of instruction e. Lock L2 can be obtained as a result of the execution of instruction f and the log entry 101*f* representing instruction f is created. The hash table 106 is searched to determine if a previous release of lock L2 has been performed. In this illustration, the hash record 109*a* includes a pointer 110 to log entry 101*o*, at the time that instruction f is executed, because log entry 101*o* is associated with the previous release of L2. That pointer 110 from the hash record 109*a* is used to update log entry 101*f* to point to log entry 101*o* as indicated by 290*b*.

Instructions g-l are executed resulting in the creation of log entries 101*g*-101*i*. As a part of creating log entry 101*i*, which represents a release of lock L2 at instruction i, the hash record 109*a* is updated to point to log entry 101*i*, which represents the most recent release of L2 by instruction i. Thus, the log address 110 associated with hash record 109*a* is updated to point respectively at log entries 101*d*, 101*o*, and 101*i* as the result of executing instructions d, o, and i in this illustration.

Instruction j is executed resulting in log entry 101*j* being created. The hash table 106 is searched to determine if a previous release of lock L1 has been performed. Since this is the first release of lock L1, the bucket pointer 107*b* is initialized to point to a hash record 109*b* and the log address 110 associated with hash record 109*b* is initialized to point to log entry 101*j*.

Although various embodiments are described in the context of data structures, such as log entries 101*a*, 101*b*, 101*d*, 101*f*, 101*l*, 101*j*, 101*l*, 101*o*, among other things, that correspond to lock acquisitions and lock releases, various embodiments are well suited for other types of code constructs, such as the start and the end of an atomic section. For example, the log entries 101*a*, 101*b*, 101*d*, 101*f*, 101*l*, 101*j*, 101*l*, 101*o* can represent respective starts and ends of respective atomic sections instead of critical sections. Although the application instance 200*a*, 200*b* in this illustration is for multiple execution entities 200*a*, 200*b*, various embodiments are well suited to creating a log structure 100 for an application instance with a single execution entity.

According to various embodiments, one or more execution entities associated with an application entity, one or more execution entities used for creating a structure 100, and one or more execution entities for accessing the log structure 100 can be performed concurrently. According to various embodiments, the instructions that modify persistent variables, such as instructions c, g, h, m, and n (FIG. 2A), and code constructs of mutually exclusive instruction execution regions, such as instructions a, b, d, l, j, l, and o (FIG. 2A), are instrumented so that appropriate routines, that perform processing and create a log structure 100 as the execution entities 200*a*, 200*b* (FIG. 2A) execute, are invoked.

The creation and publication of a log entry shall be discussed in preparation of a discussion of processing that is performed as a part of instrumenting instructions, as discussed herein. The creation and publication of a log entry shall be referred to as Create&PublishNewLogEntry. For the sake of simplicity, the Create&PublishNewLogEntry shall also be referred to as Create&Publish.

According to one embodiment, the effect of a write to a persistent variable is made visible to persistent memory. For example, if a value that is written to a persistent variable is stored in cache before being stored in the persistent memory, a function, which is referred to herein as VisibilityBarrier, is provided that causes the value to be written to persistent memory from the cache. The VisibilityBarrier can use a cache line flush, among other things, to write the value from cache to persistent memory. A VisibilityBarrier is inserted after creation of a log entry and before the corresponding store, according to one embodiment.

Figure 3A:
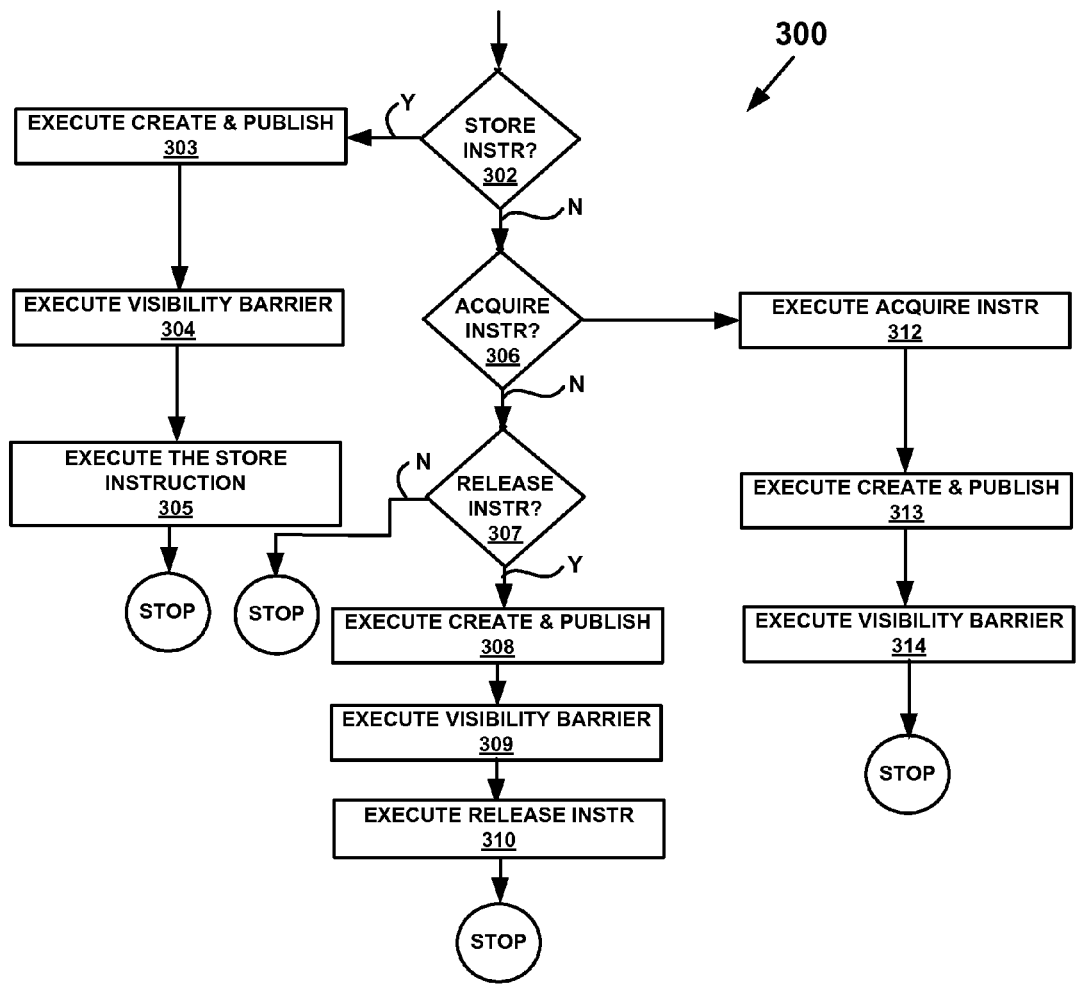
FIGS. 3A to 3B depict a flow chart for creating a log structure that represents modifications to a variable in persistent memory, according to one embodiment.
Figure 3B:
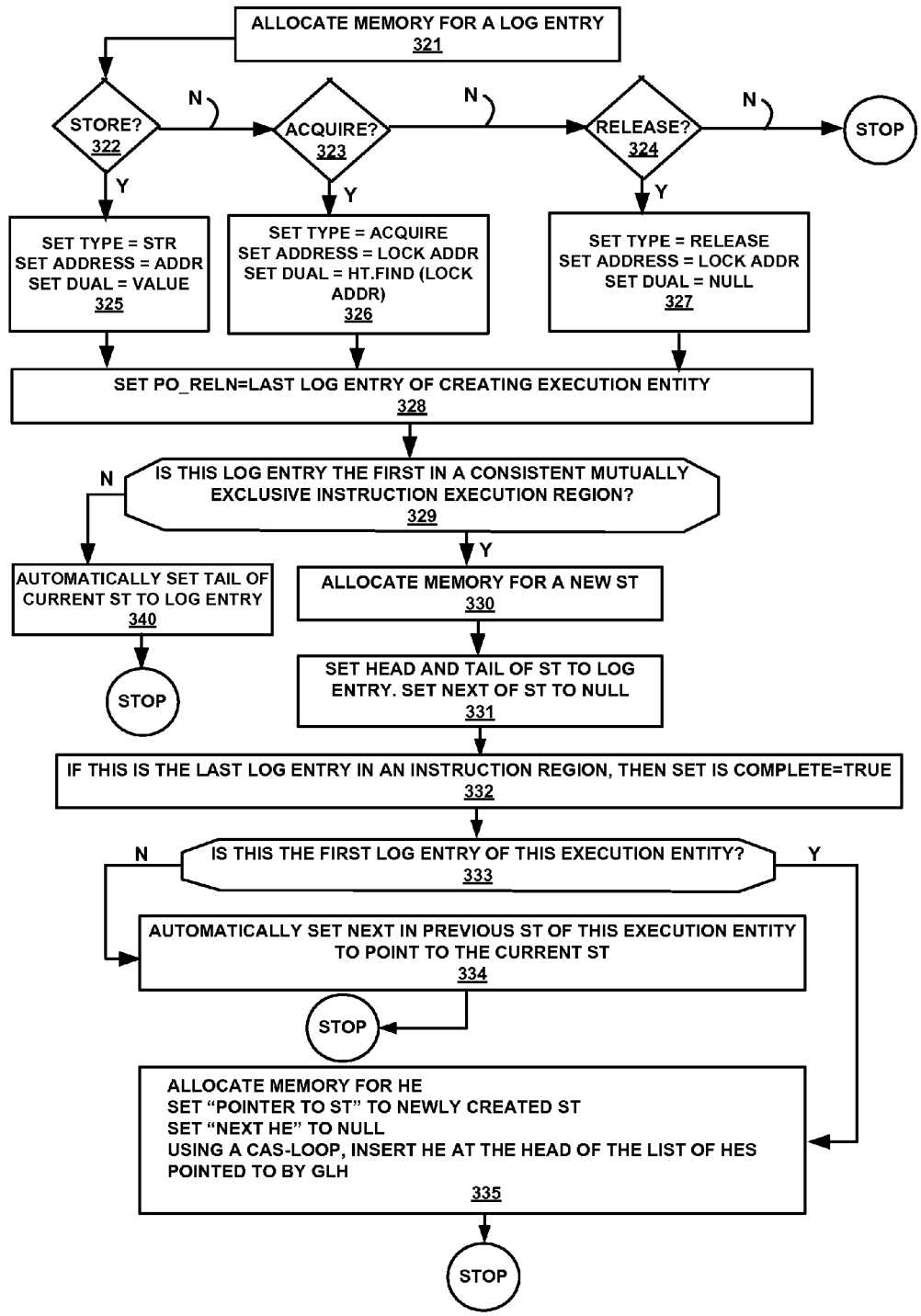

FIGS. 3A to 3B depict a flow chart for creating a log structure, according to one embodiment. Although specific operations are disclosed in flowchart 300, such operations are exemplary. That is, various embodiments are well suited to performing various other operations or variations of the operations recited in flowchart 300. It is appreciated that the operations in flowchart 300 may be performed in an order different than presented, and that not all of the operations in flowchart 300 may be performed.

Lock acquisition instructions, lock release instructions, and instructions that store into persistent variables are instrumented so that the appropriate processing and data structures depicted in FIG. 1 are created as execution entities 200*a*, 200*b* (FIG. 2A) associated with an instance 200 of an application are executed, according to one embodiment, as discussed herein. Therefore, according to one embodiment, instructions a, b, c, d, e, f, g, h, i, j, l, m, n, and o as depicted in FIG. 2A are instrumented. Instrumented instructions, according to one embodiment, cause the processing depicted in FIGS. 3A-3B to be executed.

FIG. 3A shows the overall effect of instrumentation, according to one embodiment. At 302, 306, 307, the obtained instruction is analyzed to determine if it is an instruction that stores data into a persistent variable, a lock acquisition instruction, or a lock release instruction respectively. For example, instruction a in FIG. 2A is an acquisition of a lock L1, so the determination at 306 would be true when executing instruction a during execution of execution entity 200*a*. The lock acquisition instruction a is executed at 312. The Create&PublishNewLogEntry routine is executed at 313 and the VisibilityBarrier is executed at 314.

FIG. 3B describes the operations of the routine, Create&PublishNewLogEntry, according to one embodiment. At 321, memory is allocated for a log entry 101. Using 322, 323, and 324, a determination is made on the type of log entry being published. According to one embodiment, if the log entry is for a store instruction, the fields of the log entry are set in 325. The type 102 of the log entry is set to reflect a store, the addr 103 of the log entry is set to the memory address of the corresponding store instruction, and the dual 104 is set to the last value of the memory address of the corresponding store instruction. According to one embodiment, if the log entry is of type acquire, the fields of the log entry are set in 326. The type 102 of the log entry is set to reflect an acquire instruction, the addr 103 of the log entry is set to the lock address of the corresponding lock instruction, and the dual 104 is set to the return value of a find on the hash table 106 with the lock address of the lock instruction as the argument. According to one embodiment, if the log entry is of type release, the fields of the log entry are set in 327. The type 102 of the log entry is set to reflect a release instruction, the addr 103 of the log entry is set to the lock address of the corresponding release instruction, the dual 104 is set to null, and the log entry is inserted into the hash table 106.

In 328, the PO_reln field 105 of the log entry 101 is set to the last log entry of the execution entity that created this log entry. At this point, the new log entry 101 is created and attached to the log structure 100 but this log entry 101 is not yet published to other execution entities yet, according to one embodiment.

At 329 a determination is made as to whether the newly created log entry 101 is the first log entry in a CREG. If it is the first log entry, at 330 memory is allocated for a new state tracker 112 and at 331 its head 113 is set to the log entry 101, tail 114 to the log entry 101, and "next ST" 115 to null. If the log entry 101 is not the first in a CREG, at 340, the tail 114 of the state tracker corresponding to the CREG is atomically set to the log entry 101.

At 332 a determination is made as to whether the log entry 101 is the last instruction in a CREG. If so, is Complete 116 is set to true. At 333, a determination is made as to whether the newly created log entry 101 is the first in the creating execution entity. If not, at 334, "next ST" 115 of the state tracker 112 corresponding to the previous CREG in the execution entity that created the log entry 101 is atomically set to point to the state tracker 112 that contains the newly created log entry 101. At this point, the state tracker 112 of the CREG containing the newly created log entry is attached to the log structure but may not be published yet to other execution entities, according to one embodiment. If 333 determines that it is the first, at 335, memory is allocated for a header entry 120, "pointer to ST" 121 is made to point to the newly created state tracker 112, "next HE" 122 is set to null. Using a CAS-loop, the header entry 120 is inserted at the head of the list of header entries pointed to by GLH 118. At this point, the log entry 101 is published to all execution entities, according to one embodiment.

According to one embodiment, the PO_reln field 105 in the respective log entries 101b-101j and log entries 101m-101a are used as a part of implementing respective program-order based dynamic ordering relationships between respective log entries. According to one embodiment, the pointers 290a, 290b are used as a part of implementing synchronization-order based dynamic ordering relationships between respective log entries 101d, 101l, 101o, 101f corresponding to synchronization operations, such as instructions d, l, f, o, in concurrently executing distinct execution entities 200a, 200b of an execution instance 200 of an application.

Figure 4:
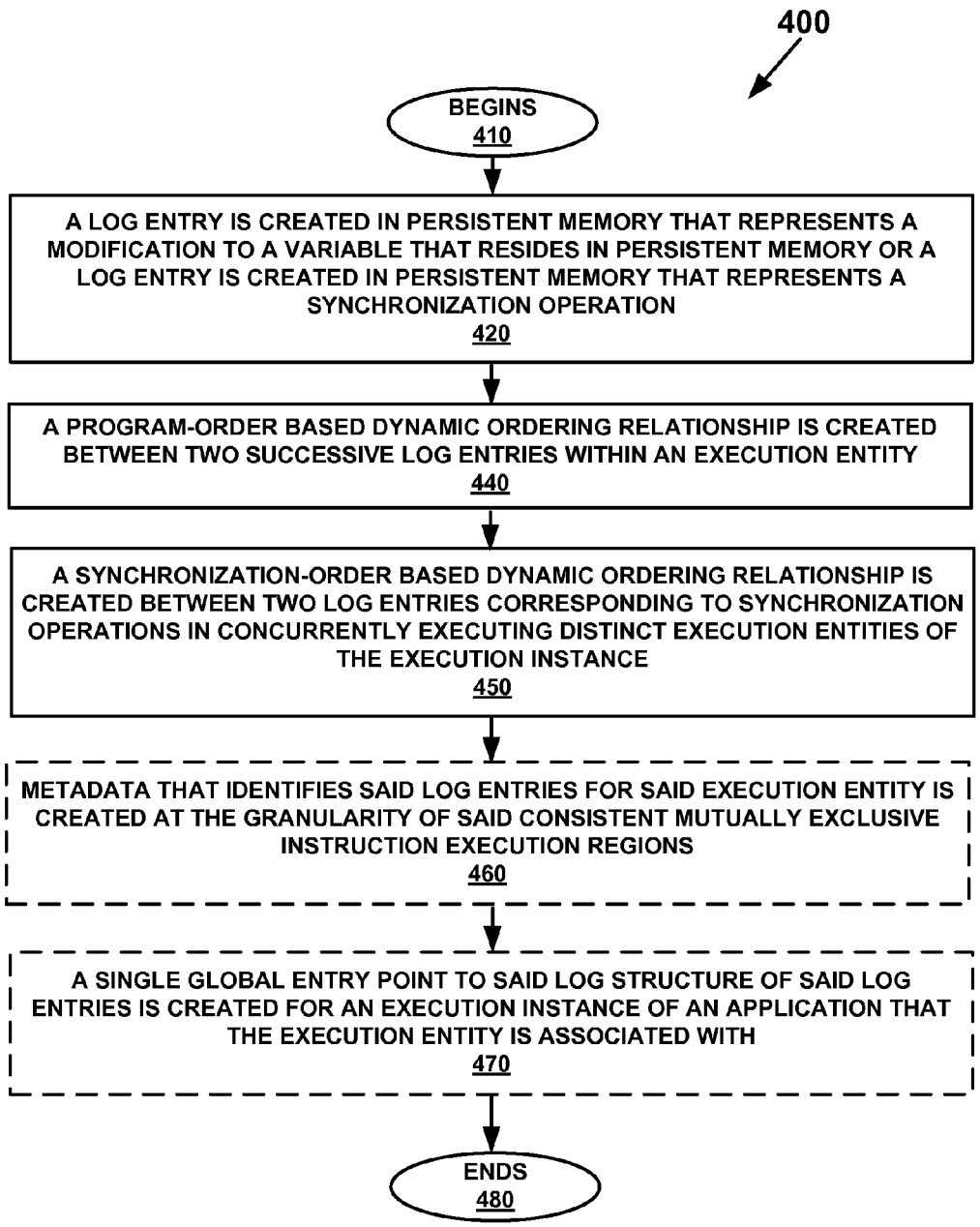
FIG. 4 is a block diagram of a flow chart for creating a log structure that represents modifications to a variable in persistent memory, according to one embodiment.

FIG. 4 is a block diagram of a flow chart showing the high-level steps for creating a log structure that represents modifications to a variable in persistent memory, according to one embodiment. Although specific operations are disclosed in flowchart 400, such operations are exemplary. That is, various embodiments are well suited to performing various other operations or variations of the operations recited in flowchart 400. It is appreciated that the operations in flowchart 400 may be performed in an order different than presented, and that not all of the operations in flowchart 400 may be performed.

At 410, the method begins. At 420, a log entry 101 is created if a modification to a persistent variable is encountered or a log entry 101 is created if a synchronization operation is encountered. Every log entry 101 is attached to the list of log entries in the same execution entity at 440. For every log entry 101 corresponding to a lock acquisition, a happens-before dependence is added from the log entry corresponding to the last release of the same lock to this log entry in 450. Metadata in the form of a state tracker 112 that identifies the log entries at the granularity of consistent mutually exclusive instruction execution regions are built up in 460 and attached to the log structure 100. At 470, any necessary header entry 120 is built up and attached to the list of header entries 119 that is in turn reachable from the single global entry point 117 of the log structure 100. 470 ensures that a newly created log entry is now published to all execution entities. At 480, the method ends. According to one embodiment, 460 and 470 are optional.

Figure 5:
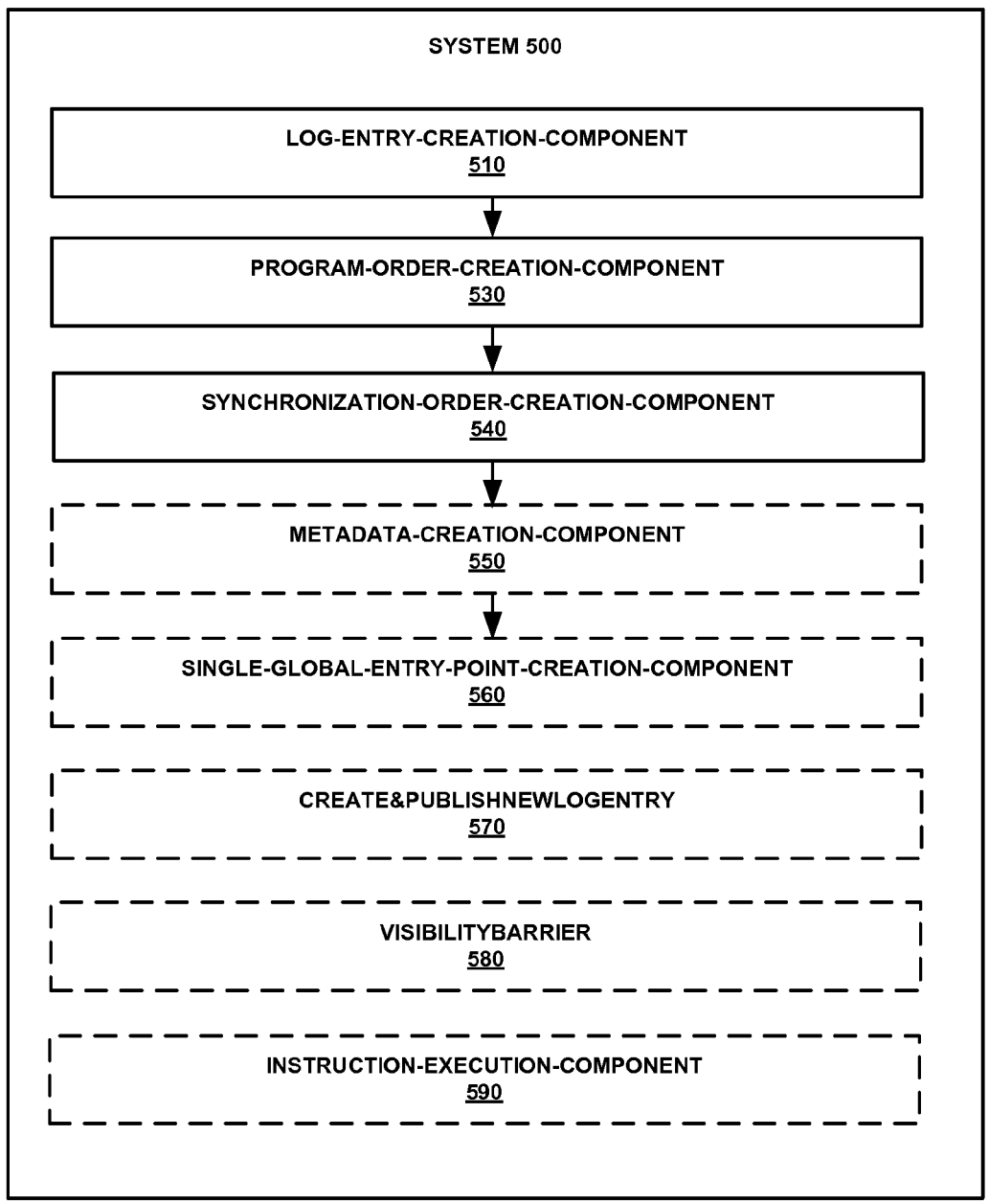
FIG. 5 depicts a block diagram of a system for creating a log structure that represents modifications to a variable in persistent memory, according to one embodiment.

FIG. 5 depicts a block diagram of a system 500 for creating a log structure 100 that represents modifications to a variable in persistent memory, according to one embodiment. The system 500 includes a log-entry-creation-component 510, a program-order-creation-component 530, and a synchronization-order-creation-component 540, according to one embodiment. According to one embodiment, the system 500 optionally includes a metadata-creation-component 550, a single-global-entry-point-creation-component 560, Create&PublishNewLogEntry 570, as discussed herein, VisibilityBarrier 580, as discussed herein, and instruction-execution-component 590.

The log-entry-creation-component 510 is for creating 420 a log entry in persistent memory that represents a modification to a variable that resides in persistent memory and for creating a log entry in persistent memory that represents a synchronization operation, as discussed herein. The program-order-creation-component 530 is for creating 440 a program-order based dynamic ordering relationship between two successive log entries within an execution entity, as discussed herein. The synchronization-order-creation-component 540 is for creating 450 a synchronization-order based dynamic ordering relationship between two log entries corresponding to synchronization operations in concurrently executing distinct execution entities of the execution instance, as discussed herein.

The metadata-creation-component 550 is for creating 460 metadata that identifies the log entries for the execution entity at the granularity of the consistent mutually exclusive instruction execution regions, as discussed herein. The single-global-entry-point-creation-component 560 is for creating 470 a single global entry point to the log structure of the log entries for an execution instance of an application that the execution entity is associated with, as discussed herein.

According to one embodiment, at least one execution entity is associated with the system 500 for creating, manipulating or traversing, or a combination thereof, the data structures 112, 101, 117, 106 associated with a log structure 100. According to one embodiment, an execution entity for creating data structures 112, 101, 117, 106 associated with the log structure 100 are also referred to herein as a log structure creating execution entity or a creation entity. Examples of components associated with the log structure creation execution entity include any one or more of the creation-components 510, 530, 540, 550, 560 and the Create&PublishNewLogEntry 570. Examples of concurrently executing execution entities include execution entities 200a, 200b of an application instance 200 or any one or more execution entities associated with the system 500, or a combination thereof.

According to one embodiment, the VisibilityBarrier 580 guarantees that a log entry is visible on persistent memory before the effects of the corresponding data or synchronization operation are visible on persistent memory. According to one embodiment, the Create&PublishNewLogEntry 570 publishes a log entry corresponding to a store instruction, to make the log entry of the store instruction visible to other execution entities. According to one embodiment, the Create&PublishNewLogEntry 570 makes a log entry for an existing mutually exclusive instruction execution region visible to other concurrently executing execution entities by an atomic pointer switch, where the atomic pointer switch consists of resetting a tail of a state tracker representing a mutually exclusive instruction execution region to the log entry. According to one embodiment, the Create&PublishNewLogEntry 570 makes a new consistent mutually exclusive instruction execution region visible to other concurrently executing entities by creating and populating a first state tracker, and subsequent to the populating, making an atomic pointer switch, where the atomic pointer switch consists of resetting a connector, such as the next ST 115, between a second state tracker and the first state tracker and where the second state tracker immediately precedes the first state tracker.

For the sake of illustration, assume that the execution entity 200a begins execution before execution entity 200b, and, therefore, according to one embodiment, the header entry 120a that corresponds to execution entity 200a is created before the header entry 120b that corresponds to execution entity 200b. According to one embodiment, the Create&PublishNewLogEntry 570 makes a new header entry 120b, which corresponds to the new execution entity 200b, visible to other concurrently executing execution entities by repeatedly executing a sequence of a first operation, a second operation and a third operation until the sequence is deemed successful, where the first operation in the sequence is a retrieval of a location pointed to by GLH 118, the second operation in the sequence is to connect the new header entry 120b to a location returned by the first operation, the third operation in the sequence is an atomic compare-and-swap of GLH 118 with an address of the new header entry 120b, and the sequence is deemed successful when the atomic compare-and-swap operation completes successfully.

The program-order-creation-component 530 is further for arranging the log entries 101a-101j of an execution entity 200a in the form of a list under the header entry 120a. Similarly, the log entries 101l-101o of execution entity 200b are arranged in the form of another list under the header entry 120b.

The metadata-creation-component 550 is further for creating a state tracker to capture a consistent mutually exclusive instruction execution region corresponding to a code section identified by code constructs, where the head and tail of a state tracker refer to the start and end respectively of the corresponding code section, the state trackers denoting the consistent mutually exclusive instruction execution regions are connected together in the form of a list. Examples of consistent mutually exclusive instruction regions are 210a-210d. In FIG. 2B, the state tracker 112a identifies a consistent mutually exclusive instruction execution region 210c. The head and tail of 112a point to the first 101a and the last instruction 101j respectively corresponding to the consistent mutually exclusive instruction execution region 210c. Similarly, the head and tail of state tracker 112b point to the first 101l and the last instruction 101o respectively corresponding to the consistent mutually exclusive instruction execution region 210d. The next fields of both 112a and 112b are NULL since they are the last consistent mutually exclusive instruction execution regions in their respective execution entities.

The single-global-entry-point-creation component 560 is further for creating a header entry 120 for every execution entity that is used to refer to the list of state trackers 112 of the execution entity, connecting the header entries 120 representing all the concurrently executing entities in the form of a list 119, and creating an atomically updatable global log entry-point 118 that points to the list 119 of header entries 120.

According to one embodiment, the log structure 100 is dynamically built, for example using the creation-components 510-560, as the instance 200 of the application executes, where for every release synchronization operation, a corresponding synchronization object address, such as the address in memory of a lock variable L1 or L2 accessible for example through the addr field 103, and its representing log entry are added to a hash table 106 as the instance 200 of the application executes, where for every acquire synchronization operation, the hash table 106 is queried with the corresponding synchronization object and a happens before ordering relationship is dynamically added to the log structure 100 from any log entry obtained from a query to a log entry for an acquire synchronization operation.

According to one embodiment, the log structure 100 and a hash table 106 are created, manipulated, and traversed without any of a plurality of execution entities 200a, 200b, and any one or more execution entities associated with the system 500, being blocked while performing any of the creating, the manipulating, and the traversing, wherein the creating, the manipulating, and the traversing are performed by at least some of the plurality of execution entities that are not blocked while performing any of the creating, the manipulating and the traversing, and a non-blocking nature of the execution entities is provided by performing atomic pointer switching, such as a CAS-loop or an atomic pointer update, within the log structure 100 and the hash table 106.

According to one embodiment, the instruction-execution-component 590 is for executing the store instruction after the publishing, whereas for an acquire synchronization operation, the acquire synchronization operation is executed and then the corresponding log entry is published by the Create&PublishNewLogEntry 570 and VisibilityBarrier 580 to be visible to other execution entities and to persistent memory, where for a release synchronization operation, the corresponding log entry is published by the Create&PublishNewLogEntry 570 and VisibilityBarrier 580 to be visible to other execution entities and to persistent memory, and subsequent to the publishing, executing the release synchronization operation.

Various embodiments were illustrated assuming certain timings of execution of various instructions. However, embodiments are well suited for other timing of execution of instructions. For example, execution entity 200a may start before execution entity 200b or vice versa. Execution entity 200a may obtain a particular lock before execution entity 200b obtains the same lock or vice versa. Further still, the instructions of a first instance of an application may be executed in a different order and with different timings than the instructions of a second instance of the same application. The order in which the data structures 112, 101, 117, 106 of a log structure 100 are created and the values of the fields in the data structures 112, 101, 117, 106 reflect the different execution order and timing between the different application instances, according to one embodiment.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. In the event that the computer readable storage medium is main memory, the main memory can be either volatile or non-volatile, i.e., persistent. As described above, certain processes and operations of various embodiments are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments. According to one embodiment, the non-transitory computer readable storage medium is tangible.

In prior art, various techniques, such as check pointing, annotations, systems that require specialized hardware specifically for logging modifications to variables are used by conventional systems. But such checkpoints in prior art are not always globally consistent. Conventional thread-private logs do not maintain any inter-thread relationships. According to various embodiments, specialized hardware for logging modifications to a variable in persistent memory is not used or is not required. According to one embodiment, software that executes on hardware, which is not specialized for the purpose of logging modifications to a variable in persistent memory, provides for the logging modifications to a variable in persistent memory. According to one embodiment, the executing entities with operations or instructions that modify a persistent variable execute on the same computer system. According to one embodiment, the executing entities with operations or instructions that modify a persistent variable execute on the same computer system are not or are not required to execute on different computer systems. According to one embodiment, the execution entities can be parts of a distributed program and hence execute on distinct machines. According to one embodiment, the persistent memory is located on the memory bus of the computer system that executes the execution entities that modify a persistent variable. According to one embodiment, the persistent memory is not or is not required to be a disk drive.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims. The illustrations of various embodiments are only provided by way of example and not by way of limitation.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. An online, non-blocking method for creating a log structure, for an execution instance of an application, representing modifications to a variable residing in persistent memory and for capturing dynamic ordering relationships among log entries, the method comprising:

creating a log entry in persistent memory that represents a modification to a variable that resides in persistent memory;

creating a log entry in persistent memory that represents a synchronization operation;

creating a program-order based dynamic ordering relationship between two successive log entries within an execution entity; and creating a synchronization-order based dynamic ordering relationship between two log entries corresponding to synchronization operations in concurrently executing distinct execution entities of said execution instance.

2. The method as recited by claim 1, wherein the method further comprises:

guaranteeing that said log entry representing said modification is visible on persistent memory before effects of said modification are visible on persistent memory;

arranging said log entries of said execution entity in a list;

configuring the said log entries at the granularity of consistent mutually exclusive instruction execution regions;

creating a state tracker to capture a consistent mutually exclusive instruction execution region corresponding to a code section of said execution entity identified by code constructs, wherein a head and a tail of a state tracker refer to a start and an end respectively of said code section, wherein state trackers denoting said consistent mutually exclusive instruction execution regions are connected together in a list; and creating a single global entry point to said log structure of said log entries for said execution instance of said application.

3. The method as recited by claim 1, wherein the method further comprises:

dynamically building said log structure as said instance of said application executes, wherein for every release synchronization operation, a corresponding synchronization object address and its representing log entry are added to a hash table as said instance of said application executes, wherein for every acquire synchronization operation, said hash table is queried with said corresponding synchronization object and a happens before ordering relationship is dynamically added to said log structure from any log entry obtained from a query to a log entry for an acquire synchronization operation.

4. The method as recited by claim 1, wherein the method further comprises:

creating, manipulating, and traversing of said log structure and a hash table without any of a plurality of execution entities being blocked while performing any of said creating, said manipulating, and said traversing, wherein said creating, said manipulating, and said traversing are performed by at least some of said plurality of execution entities that are not blocked while performing any of said creating, said manipulating and said traversing, and providing a non-blocking nature of said execution entities by performing atomic pointer switching within said log structure and said hash table.

5. The method as recited by claim 1, wherein the method further comprises:

publishing, performed by a log structure creating execution entity, a log entry corresponding to a store instruction, to make said log entry of said store instruction visible to other execution entities and to persistent memory;

executing said store instruction after said publishing, wherein for an acquire synchronization operation, said acquire synchronization operation is executed and then said corresponding log entry is published by said log structure creating execution entity to be visible to other execution entities and to persistent memory, wherein for a release synchronization operation, said corresponding log entry is published by said log structure creating execution entity to be visible to other execution entities and to persistent memory; and subsequent to said publishing, executing said release synchronization operation.

6. The method of claim 5, wherein the method further comprises:

making a log entry for an existing consistent mutually exclusive instruction execution region visible to other concurrently executing execution entities and to persistent memory by an atomic pointer switch, wherein said visibility is performed by said log structure creating execution entity and wherein said atomic pointer switch consists of resetting a tail of a state tracker representing a consistent mutually exclusive instruction execution region to said log entry.

7. The method of claim 5, wherein the method further comprises:

making visible a new consistent mutually exclusive instruction execution region to other concurrently executing entities and to persistent memory by:
creating and populating a first state tracker, and
subsequent to said populating, making an atomic pointer switch, wherein said atomic pointer switch consists of resetting a connector between a second state tracker and said first state tracker and wherein said second state tracker immediately precedes said first state tracker.

8. The method of claim 5, wherein the method further comprises:

making visible, performed by a new execution entity, a new header entry corresponding to said new execution entity to other concurrently executing execution entities and to persistent memory by repeatedly executing a sequence of a first operation, a second operation and a third operation until said sequence is deemed successful, wherein said first operation in said sequence is a retrieval of a location pointed to by a single global entry point, wherein said second operation in said sequence is to connect said new header entry to a location returned by said first operation, wherein said third operation in said sequence is an atomic compare-and-swap of said single global entry point with an address of said new header entry, and wherein said sequence is deemed successful when said atomic compare-and-swap operation completes successfully.

9. An online, non-blocking system for creating a log structure, for an execution instance of an application, representing modifications to a variable residing in persistent memory and for capturing dynamic ordering relationships among log entries, configured at a granularity of consistent mutually exclusive instruction execution regions, the system comprising:

a processor; and
a non-transitory computer readable medium comprising instructions executed by the processor to implement at least:
a log-entry-creation-component to create a log entry in persistent memory that represents a modification to a variable that resides in persistent memory;
the log-entry-creation-component to create a log entry in persistent memory that represents a synchronization operation;
a program-order-creation-component to create a program-order based dynamic ordering relationship between two successive log entries within an execution entity; and
a synchronization-order-creation-component to create a synchronization-order based dynamic ordering relationship between two log entries corresponding to synchronization operations in concurrently executing distinct execution entities of said execution instance.

10. The system of claim 9, further comprising instructions to implement:

a Create&PublishNewLogEntry to guarantee that said log entry representing a data operation is visible on persistent memory before effects of said data operation are visible on persistent memory;
the program-order-creation-component to arrange the log entries of an execution entity in a list;
a metadata-creation-component to create a state tracker to capture a consistent mutually exclusive instruction execution region corresponding to a code section identified by code constructs, wherein a head and a tail of a state tracker refer to a start and an end respectively of the corresponding code section, wherein the state trackers denoting the consistent mutually exclusive instruction execution regions are connected together in a list; and
a single-global-entry-point-creation component for creating a header entry for every execution entity that is used to refer to the list of state trackers of the said execution entity, connecting the header entries representing all the concurrently executing entities in a list, and creating an atomically updatable global log entry-point that points to the list of header entries.

11. The system of claim 9, wherein said log structure is dynamically built as said instance of said application executes, wherein for every release synchronization operation, a corresponding synchronization object address and its representing log entry are added to a hash table as said instance of said application executes, wherein for every acquire synchronization operation, said hash table is queried with said corresponding synchronization object and a happens before ordering relationship is dynamically added to said log structure from any log entry obtained from a query to a log entry for an acquire synchronization operation.

12. The system of claim 9, wherein said log structure and a hash table are created, manipulated, and traversed without any of a plurality of execution entities being blocked while performing any of said creating, said manipulating, and said traversing, wherein said creating, said manipulating, and said traversing are performed by at least some of said plurality of execution entities that are not blocked while performing any of said creating, said manipulating and said traversing, and a non-blocking nature of said execution entities is provided by performing atomic pointer switching within said log structure and said hash table.

13. The system of claim 9, further comprising instructions to implement:

a Create&PublishNewLogEntry to publish a log entry corresponding to a store instruction, to make said log entry of said store instruction visible to other execution entities and to persistent memory; and
an instruction-execution-component to execute said store instruction after said publishing, wherein for an acquire synchronization operation, said acquire synchronization operation is executed and then said corresponding log entry is published by said log structure creating execution entity to be visible to other execution entities and to persistent memory, wherein for a release synchronization operation, said corresponding log entry is published by said log structure creating execution entity to be visible to other execution entities and to persistent memory, and subsequent to said publishing, executing said release synchronization operation.

14. The system of claim 13, wherein the instructions to implement the Create&PublishNewLogEntry are further to:
   make a log entry for an existing consistent mutually exclusive instruction execution region visible to other concurrently executing execution entities and to persistent memory by an atomic pointer switch, wherein said visibility is performed by said log structure creating execution entity and wherein said atomic pointer switch consists of resetting a tail of a state tracker representing a consistent mutually exclusive instruction execution region to said log entry.

15. The system of claim 13, wherein the instructions to implement the Create&PublishNewLogEntry are further to:
   make visible a new consistent mutually exclusive instruction execution region to other concurrently executing entities and to persistent memory by:
      creating and populating a first state tracker, and
      subsequent to said populating, making an atomic pointer switch, wherein said atomic pointer switch consists of resetting a connector between a second state tracker and said first state tracker and wherein said second state tracker immediately precedes said first state tracker.

16. The system of claim 13, wherein the instructions to implement the Create&PublishNewLogEntry are further to:
   make visible, performed by a new execution entity, a new header entry corresponding to said new execution entity to other concurrently executing execution entities and to persistent memory by repeatedly executing a sequence of a first operation, a second operation and a third operation until said sequence is deemed successful,
   wherein said first operation in said sequence is a retrieval of a location pointed to by a single global entry point,
   wherein said second operation in said sequence is to connect said new header entry to a location returned by said first operation,
   wherein said third operation in said sequence is an atomic compare-and-swap of said single global entry point with an address of said new header entry, and
   wherein said sequence is deemed successful when said atomic compare-and-swap operation completes successfully.

17. A non-transitory computer readable storage medium having computer-executable instructions stored thereon for causing a computer system to perform an online, non-blocking method for creating a log structure, for an execution instance of an application, representing modifications to a variable residing in persistent memory and for capturing dynamic ordering relationships among log entries, configured at a granularity of consistent mutually exclusive instruction execution regions, the method comprising:
   creating a log entry in persistent memory that represents a modification to a variable that resides in persistent memory;
   creating a log entry in persistent memory that represents a synchronization operation;
   creating a program-order based dynamic ordering relationship between two successive log entries within an execution entity; and
   creating a synchronization-order based dynamic ordering relationship between two log entries corresponding to synchronization operations in concurrently executing distinct execution entities of said execution instance.

18. The non-transitory computer readable storage medium of claim 17, wherein the method further comprises:
   guaranteeing that said log entry representing said modification is visible on persistent memory before effects of said modification are visible on persistent memory;
   arranging said log entries of said execution entity in a list;
   creating a state tracker to capture a consistent mutually exclusive instruction execution region corresponding to a code section of said execution entity identified by code constructs, wherein a head and a tail of a state tracker refer to a start and an end respectively of said code section, wherein state trackers denoting said consistent mutually exclusive instruction execution regions are connected together in a list;
   creating a header entry for every execution entity that is used to refer to said list of said state trackers of said execution entity;
   connecting said header entries representing all concurrently executing entities of said instance of said application in a list; and
   creating an atomically updatable global log entry-point that points to said list of said header entries.

19. The non-transitory computer readable storage medium of claim 17, wherein the method further comprises:
   dynamically building said log structure as said instance of said application executes, wherein for every release synchronization operation, a corresponding synchronization object address and its representing log entry are added to a hash table as said instance of said application executes,
   wherein for every acquire synchronization operation, said hash table is queried with said corresponding synchronization object and a happens before ordering relationship is dynamically added to said log structure from any log entry obtained from a query to a log entry for an acquire synchronization operation.

20. The non-transitory computer readable storage medium of claim 17, wherein the method further comprises:
   creating, manipulating, and traversing of said log structure and a hash table without any of a plurality of execution entities being blocked while performing any of said creating, said manipulating, and said traversing, wherein said creating, said manipulating, and said traversing are performed by at least some of said plurality of execution entities that are not blocked while performing any of said creating, said manipulating and said traversing, and providing a non-blocking nature of said execution entities by performing atomic pointer switching within said log structure and said hash table.

* * * * *